United States Patent [19]

Hebert

[11] Patent Number: 4,893,110
[45] Date of Patent: Jan. 9, 1990

[54] PROCESS FOR DETECTING ANOMALIES BY USE OF PRESSURE AND TEMPERATURE MEASUREMENTS IN A TIRE-MONITORING DEVICE

[75] Inventor: Jacques Hebert, Jouy-en-Josas, France

[73] Assignee: Compagnie Generale des Establissements Michelin-Michelin & Cie, Clermont-Ferrand, France

[21] Appl. No.: 258,519

[22] Filed: Oct. 17, 1988

[30] Foreign Application Priority Data

Nov. 9, 1987 [FR] France ................................. 87 15611

[51] Int. Cl.$^4$ ............................................. B60C 23/00
[52] U.S. Cl. .................................... 340/442; 340/445; 73/146.5
[58] Field of Search .......................... 340/58, 442-449; 73/146-146.8; 116/34 R, 34 A, 34 B; 200/61.22-61.26

[56] References Cited

U.S. PATENT DOCUMENTS

| | | | |
|---|---|---|---|
| 3,691,524 | 9/1972 | Frost et al. | 340/58 |
| 4,119,944 | 10/1978 | Smith | 340/58 |
| 4,300,118 | 11/1981 | Matsuda et al. | 340/58 |
| 4,355,299 | 10/1982 | Cook, Jr. | 340/58 |
| 4,550,385 | 10/1985 | Pulk et al. | 340/58 |

FOREIGN PATENT DOCUMENTS

85/03675 8/1985 World Int. Prop. O. .

OTHER PUBLICATIONS

"Ingenieur de l'Automobile", (1984) Nov., No. 8, Paris, France.

Primary Examiner—Donnie L. Crosland
Attorney, Agent, or Firm—Oblon, Spivak, McClelland, Maier & Neustadt

[57] ABSTRACT

In order to monitor gas leakage in the tires of a vehicle, absolute gas pressure and temperature in the tires are first simultaneously measured. A ratio of the measured pressure to the measured temperature for reach of the tires is then calculated. The calculated ratios are then compared to produce an indicator N and an alarm is issued when this indicator N deviates from a predetermined range of values.

10 Claims, 2 Drawing Sheets

PROCESS FOR DETECTING ANOMALIES BY USE OF PRESSURE AND TEMPERATURE MEASUREMENTS IN A TIRE-MONITORING DEVICE

BACKGROUND OF THE INVENTION

1. Field of the Invention

This invention relates to tire-monitoring systems. More particularly it relates to the use of measurements made on tires to give one or more alarms.

2. Description of the Related Art

U.S. Pat. No. 4,703,650 describes a coding device that can be used for transmission of the pressure and temperature of a tire from the wheel to the vehicle. When a temperature of a tire on a vehicle is being continuously monitored, it is difficult to measure the exact temperature of the inflation air within the tire. It is important to exactly monitor this temperature since a pressure correction is made as a function of temperature. Precise temperature detection is also important if the ratio of the absolute temperature is to be divided by the absolute pressure, because it is this ratio which is proportional as a first approximation of a number of moles of gas in the tire, which should remain constant barring a leak of inflation fluid from the tire.

The temperature sensor is influenced by the temperature of the rim on which the tire is mounted. In almost all vehicles, this rim surrounds braking elements which dissipate a considerable amount of heat in use. This results in the detected temperature erroneously being higher than the actual temperature of the inside air during braking maneuvers. At other times the rim is usually at a temperature less than the inside temperature of the tire, resulting in an error by shortfall.

Other influences also disturb the estimation of the amount of air (number of moles) in the tires. Thus, during turning, the tires at the outside of the turn are flattened, causing a reduction in volume and so an increase in pressure, while the opposite occurs for the tires on the opposite side. Here again, errors by excess or shortfall can occur in the number of moles calculated.

SUMMARY OF THE INVENTION

An object of this invention is to take these disturbing influences into account without resorting to additional sensors. Therefore, it is possible to decide suitably and quickly if a tire, or more generally any rotating element, set is in an abnormal state.

According to the invention, a process for monitoring parameters relative to the wheels of a vehicle, for example, abnormalities in the total number of moles of gas in a tire, includes the steps of substantially simultaneously measuring both pressure and temperature values in tires mounted on each of the wheels of a vehicle, calculating the ratio of the measured pressure of the measure temperature for each of the tires, comparing said ratio for one of the tires with said ratio for at least another one of the tires, and outputting an alarm when a result N of the comparison deviates from a predetermined range of values.

BRIEF DESCRIPTION OF THE DRAWING

A better understanding of the present invention may be appreciated with reference to the attached Figures in which.

DETAILED DESCRIPTION OF THE PREFERRED EMBODIMENTS

Figure 1:
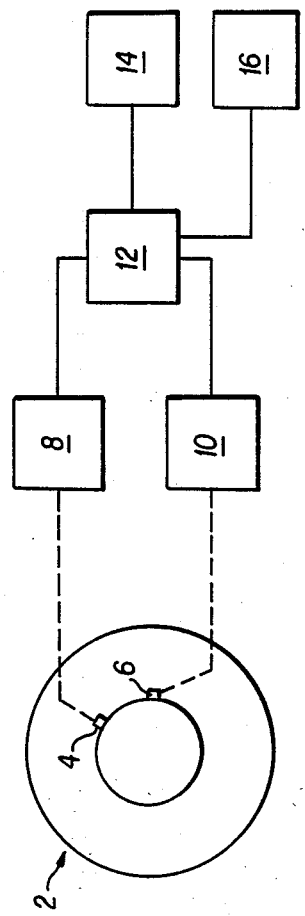
FIG. 1 is a schematic illustration apparatus for carrying out the process of the invention.

The manner in which the invention can be used in a passenger vehicle is described below in a nonlimiting fashion.

On each of the wheels 2 (only one is shown) are installed sensors 4 for the pressure and sensors 6 for the temperature of the tire, as well as respective elements 8 and 10 capable of receiving a measurement of these parameters (and not simply detecting a threshold) and transmiting the measured values as coded signals to a computer 12 on board the vehicle. Any suitable device can be used, such as, for example, that of U.S. Pat. No. 4,703,650.

Figure 2:
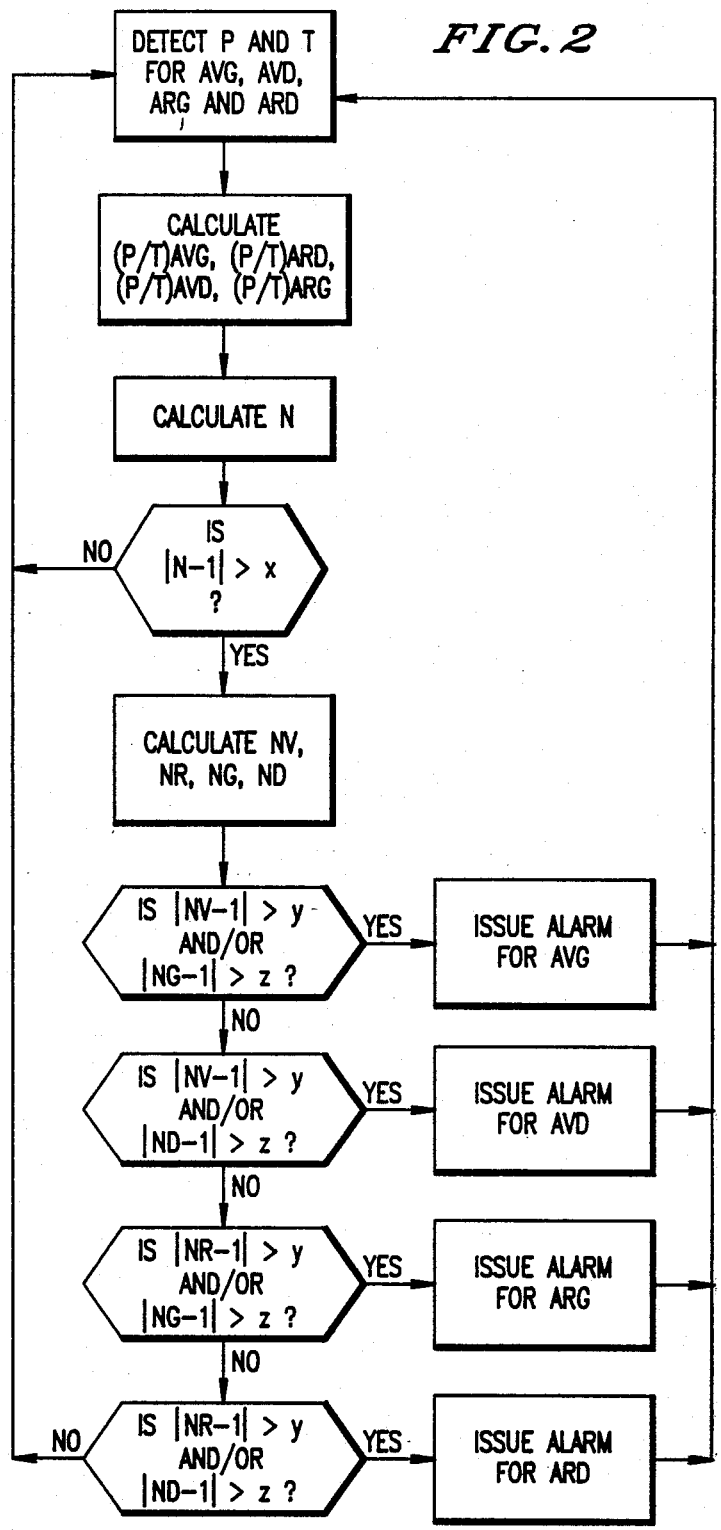
FIG. 2 is a flow chart of an embodiment of the invention.

The computer 12, suited to the type of transmitted signals, is installed on the vehicle and processes the measured values of absolute pressure P and absolute temperature T for each tire, as shown in FIG. 2. Estimates for the pressure/temperature ratio (P/T estimate) are constantly calculated for each wheel. Puncture indicator N is a ratio of two sums. Preferably, for a four-tire vehicle, such as a passenger vehicle, N is calculated as follows:

$$N = \frac{\left(\frac{P}{T}\right)_{AVG} + \left(\frac{P}{T}\right)_{ARD}}{\left(\frac{P}{T}\right)_{AVD} + \left(\frac{P}{T}\right)_{ARG}} = \frac{S1}{S2}$$

where the subscripts have the following meanings:

AVG means that the estimate is that of the left front tire,

AVD means that the estimate is that of the right front tire,

ARG means that the estimate is that of the left rear tire,

ARD means that the estimate is that of the right rear tire.

Thus, a "crosswise" puncture indicator N is constructed by analogy with the manner of making a comparison among the four ratios for overall monitoring of a passenger vehicle.

It is also possible to construct a "parallel" puncture indicator N in which the numerator is the sum of the ratios relative to the tires of one side and the denominator is the sum of the ratios relative to the tires of the other side. It is also possible to construct indicators by comparing only the two tires of a single axle, or for only one side of the vehicle, by determining a ratio or a difference of P/T estimates.

For a vehicle with more than two axles, it is possible to calculate N as a ratio of sums having the same number of terms as there are axles. A "parallel" indicator is calculated by staying on the same side at each change of axle to construct each sum, and a "crosswise" indicator is calculated by changing sides at each change of axle to construct each sum.

For a vehicle with two axles, the best results are obtained with a "crosswise" indicator. Besides a high degree of insensitivity to the heat released by the brakes, it is the one least sensitive to disturbances caused by other parameters (for example, load transfers, static load, effect of centrifugal force on the sensors).

By resorting to a computer 12 (e.g., a microprocessor), it is thus possible to obtain, in real time, P/T estimates for all tires, from which the "crosswise" N indicator is calculated. The filtered value of the latter, over a period $t_1$, on the order of two seconds, makes it possible to reject all very brief fluctuations in N whose frequency is less than a value corresponding approximately to the rotation of a wheel. Thus, this indicator N can be used to determine very quickly if there is an abnormal state in one of the tires. Very quickly means very shortly after the actual appearance of the anomaly, for example, a puncture. Although this monitoring process alone makes impossible the identification of the faulty tire the measurement speed is not negatively affected and the accuracy of the measurements made on the tires is improved.

The ability of a tire-monitoring system to rapidly detect anomalies is basic for high-performance vehicles. With such an indicator, the threshold for issuing a signal indicative of an anomaly can be lowered to a value that makes it possible to take full advantage of the precision of the sensors and the coding and decoding circuits. For example, it is possible to issue an alarm signal from alarm 14 if $|N-1| \geq 0.02$. The value of this alarm signal threshold should be determined experimentally, taking into account the type of sensors used and the type of vehicle. In contrast, monitoring the tires individually requires raising the alarm threshold beyond 0.1 for fear of giving false alarms. This is particularly true for the front tires, because of the predominant influence of the front brakes, and because of the need to consider the worst-case error when choosing the threshold.

It is also possible to identify the tire involved and to activate additional alarms 16, based upon the following:

Ratio N is calculated as above (value filtered during period $t_1$), and the values filtered during periods $t_2$ (where $t_2 > t_1$) are calculated for the following ratios:

$$NV = \left(\frac{P}{T}\right)_{AVG} \left(\frac{T}{P}\right)_{AVD}$$

$$NR = \left(\frac{P}{T}\right)_{ARG} \left(\frac{T}{P}\right)_{ARD}$$

$$NG = \left(\frac{P}{T}\right)_{AVG} \left(\frac{T}{P}\right)_{ARG}$$

$$ND = \left(\frac{P}{T}\right)_{AVD} \left(\frac{T}{P}\right)_{ARD}$$

then:
an alarm relative to the left front tire is given if $|N-1|>x$ and if $|NV-1|>y$ and/or if $|NG-1|>z$, x, y and z being values determined experimentally,
an alarm relative to the right front tire is give if $|N-1|>x$ and/or if $|NV-1|>y$, and/or if $|ND-1|>z$,
an alarm relative to the left rear tire is given if $|N-1|>x$ and/or if $|NR-1|>y$ and/or if $|NG-1|>z$,
an alarm relative to the right rear tire is given if $|N-1|>x$ and/or if $|NR-1|>y$ and/or if $|ND-1|>z$.

Alternatively, the P/T estimate can be monitored individually for each wheel and an additional alarm can be given in case a threshold is exceeded, said threshold not being a constant, but being continuously calculated as a function of the value of an indicator N constructed according to the principle disclosed herein. As another alternative, other conditions may be estimated as a function of the value of an indicator. By way of illustration, it is noted that on a passenger vehicle the "parallel axle" indicator (ratio of the sums of the P/T estimates of the wheels for each axle) is good indicator of the brake stresses. Therefore it is possible to raise the alarm signal thresholds for front tires only when the brake stress is great, or at least to take it into account in some way.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for monitoring parameters relative to wheels of a vehicle, comprising the steps of:
   substantially simultaneously measuring pressure and temperature values in tires mounted on each of the wheels of the vehicle;
   calculating a ratio of the measured pressure to the measured temperature for each of the tires;
   comparing said ratio for one of the tires with said ratio for at least another one of the tires; and
   outputting an alarm when a result N of said comparison deviates from a predetermined range of values.

2. The process of claim 1 wherein said comparing step comprises:
   adding said ratio for a tire mounted on a wheel of one axle of said vehicle and said ratio of at least one tire mounted on a wheel of at least one other axle of said vehicle to produce a first sum S1;
   adding said ratio for another tire mounted on a wheel of said one axle and said ratio for at least one other tire mounted on a wheel of at least one other axle of said vehicle to produce at least one second sum S2; and
   calculating said result N as S1/S2.

3. The process of claim 2 wherein said outputting step comprises outputting an alarm when $|N-1|>$ a predetermined value.

4. The process of claim 1, wherein said comparing step comprises calculating N, wherein:

$$N = \frac{\left(\frac{P}{T}\right)_{AVG} + \left(\frac{P}{T}\right)_{ARD}}{\left(\frac{P}{T}\right)_{AVD} + \left(\frac{P}{T}\right)_{ARG}}$$

where:
P is the absolute pressure in a tire,
T is the absolute temperature in a tire,
AVG refers to the left front tire,
AVD refers to the right front tire,
ARG refers to the left rear tire, and ARD refers to the right rear tire.

5. The process of claim 4 wherein said outputting step comprises outputting an alarm when $|N-1|>$ a predetermined value.

6. The process of claim 4 including the step of filtering the calculated value of N for each time period ti and outputting said alarm only when the filtered value of $|N-1|>$ a predetermined value.

7. The process of claim 6 including the steps of:
calculating values NV, NR, NG and ND, where:

$$NV = \left(\frac{P}{T}\right)_{AVG}\left(\frac{T}{P}\right)_{AVD}$$

$$NR = \left(\frac{P}{T}\right)_{ARG}\left(\frac{T}{P}\right)_{ARD}$$

$$NG = \left(\frac{P}{T}\right)_{AVG}\left(\frac{T}{P}\right)_{ARG}$$

$$ND = \left(\frac{P}{T}\right)_{AVD}\left(\frac{T}{P}\right)_{ARD};$$

issuing an alarm indicating a anomaly in the left front tire when $|N-1|>$ a predetermined value x and at least one of the following conditions is found:
$|NV-1|>$ predetermined value y
$|NG-1|>$ predetermined value z;
issuing an alarm indicating an anomaly in the right front tire when $|N-1|>x$ and at least one of the following conditions is found:
$|NV-1|>y$
$|ND-1|>z;$
issuing an alarm indicating an anomaly in the left rear tire when $|N-1|>x$ and at least one of the following conditions is found:
$|NR-1|>y$
$|NG-1|>z;$ and
issuing an alarm indicating an anomaly in the right rear tire when $|N-1|>x$ and at least one of the following conditions is found:
$|NR-1|>y$
$|ND-1|>z.$ 8. The process of claim 1 wherein said parameters comprise at least anomalies in the total number of moles of gas in a tire mounted on each of said wheels.

9. The process of claim 3 wherein said predetermined value is 0.02.

10. The process of claim 5 wherein said predetermined value is 0.02.

* * * * *